(12) United States Patent
Vrcelj et al.

(10) Patent No.: US 8,265,214 B2
(45) Date of Patent: Sep. 11, 2012

(54) METHOD AND APPARATUS FOR ADAPTIVE TIMING SYNCHRONIZATION IN A COMMUNICATION NETWORK

(75) Inventors: Bojan Vrcelj, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 655 days.

(21) Appl. No.: 12/324,818

(22) Filed: Nov. 26, 2008

(65) Prior Publication Data

US 2010/0002817 A1 Jan. 7, 2010

Related U.S. Application Data

(60) Provisional application No. 61/077,174, filed on Jul. 1, 2008.

(51) Int. Cl.
*H04L 7/00* (2006.01)
(52) U.S. Cl. ......................... 375/354; 375/260
(58) Field of Classification Search .................. 375/340, 375/260, 354
See application file for complete search history.

(56) References Cited

U.S. PATENT DOCUMENTS

| | | | |
|---|---|---|---|
| 7,042,546 B2 | 5/2006 | Tamashiro et al. | |
| 8,086,194 B2 * | 12/2011 | Koga et al. | 455/130 |
| 2004/0105512 A1 * | 6/2004 | Priotti | 375/340 |
| 2005/0152326 A1 * | 7/2005 | Vijayan et al. | 370/343 |
| 2005/0202837 A1 * | 9/2005 | Tanabe | 455/502 |
| 2005/0220175 A1 | 10/2005 | Zhou | |
| 2006/0018413 A1 | 1/2006 | Gupta | |
| 2006/0227812 A1 | 10/2006 | Vrcelj et al. | |

OTHER PUBLICATIONS

International Search Authority, PCT/US2009/045161, International Searching Authority, European Patent Office, Nov. 5, 2009.
Written Opinion, PCT/US2009/045161, International Searching Authority, European Patent Office, Nov. 5, 2009.
International Preliminary Report on Patentability, PCT/US2009/045161, International Preliminary Examining Authority, European Patent Office, Jun. 11, 2010.

\* cited by examiner

*Primary Examiner* — Emmanuel Bayard
(74) *Attorney, Agent, or Firm* — Ryan N. Farr (57) ABSTRACT

An adaptive timing synchronization process dynamically adapts timing synchronization parameters for both wide and local area channels based on channel estimates. Timing synchronization parameters are dynamically adapted according to C/I estimates calculated from WID/LID energies. The timing synchronization algorithm 102 takes as the primary input, the current channel estimate 110 and produces an output comprising a correction to the current Fast Fourier Transform (FFT) sampling window position delta T (or offset) for locating the start of data within a current symbol 108. After dynamic parameter adjustment of noise filtering thresholds 104 and weak channel tap sensitivities 106 based on a calculated C/I from the channel estimate, a timing synchronization algorithm 102 locates the beginning of each continuous symbol by finding the boundary between the preamble, or cyclic prefix, and the useful data portions interlaced with pilots for channel information defining the start of a symbol 108.

48 Claims, 4 Drawing Sheets

METHOD AND APPARATUS FOR ADAPTIVE TIMING SYNCHRONIZATION IN A COMMUNICATION NETWORK

CLAIM OF PRIORITY UNDER 35. U.S.C. §119

The present Application for Patent claims priority to Provisional Application No. 61/077,174. entitled "Enhancements to IFT and DMTT based on C/I or noise variance estimate" filed Jul. 1, 2008, and assigned to the assignee hereof and hereby expressly incorporated by reference herein.

BACKGROUND

1. Field

The present invention relates generally to the transmission of information over a distribution network, and more specifically to optimizing receiver timing synchronization.

2. Background

Data networks, such as wireless communication networks, must trade off between services customized for a single terminal and services provided to a large number of terminals. For example, the distribution of multimedia content to a large number of resource limited portable devices (subscribers) is a complicated problem. Therefore, it is very important for network administrators, content retailers, and service providers to have a way to distribute content and/or other network services in a fast and efficient manner and in such a way as to increase receiver performance, bandwidth utilization, and power efficiency.

In current content delivery/media distribution systems, wide area and local area real-time and non real-time services are packed into a transmission frame and delivered to devices on a network. For example, a communication network may utilize Orthogonal Frequency Division Multiplexing (OFDM) to provide communications between a network server and one or more portable devices. Using this technology, a transmission frame can be generated that has data slots packed with services to be delivered over a distribution network as a transmitted waveform.

Typically, a transmitter operates to transmit the transmission frames over a transmission channel to devices in communication with the network. The transmission channels often experience conditions that make it difficult for receiving devices to recover the transmitted data because traditionally determined fixed timing synchronization parameters do not dynamically accommodate changing channel conditions. For example, it is possible that timing synchronization is suboptimal or that channel conditions will change rapidly. In both instances, the result may be inaccurate OFDM symbol timing at the receiver that prevents the receiver from accurately decoding the transmitted data.

Therefore, it would be desirable to have a system that operates to provide adjustable timing synchronization, which dynamically adapts itself to prevailing channel conditions thereby avoiding the problems associated with suboptimal timing synchronization parameters and fast changing channel conditions in both wide and local area channels.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The symbol "C" is used herein to mean the total signal energy in an OFDM channel.

The symbol "I" is used herein to mean interference energy in an OFDM channel from thermal noise and any other additional in-band noise that may be present in the environment.

In one or more aspects, a method and apparatus for an adaptive receiver timing synchronization process is provided that operates to assist in data demodulation and accurate time tracking synchronization in a communication network. For the purpose of this description, aspects of the adaptive timing synchronization method and apparatus are described herein with reference to a communication network utilizing OFDM to provide communications between network servers and one or more portable devices. For example, in an aspect of an OFDM system, a server transmits a transmit waveform that comprises a transmission frame having multiplexed wide area and local data flows with a particular arrangement, sequence, interleaving, and/or other encoding of real-time and/or other than real-time data. The data is represented as symbols where each symbol comprises N sub-carriers.

As described below, adaptive timing synchronization is operable to assist in accurate time tracking synchronization so that receiving devices are able to accurately decode wide and local area channel data flows. The process is well suited for use in wireless communication networks, but may be used in any type of wireless environment, including but not limited to, public networks, such as the Internet, private networks, such as virtual private networks (VPN), local area networks, wide area networks, long haul networks, or any other type of wireless network. The adaptive timing synchronization process is advantageous to a Forward Link Only (FLO) communications system.

Figure 1:
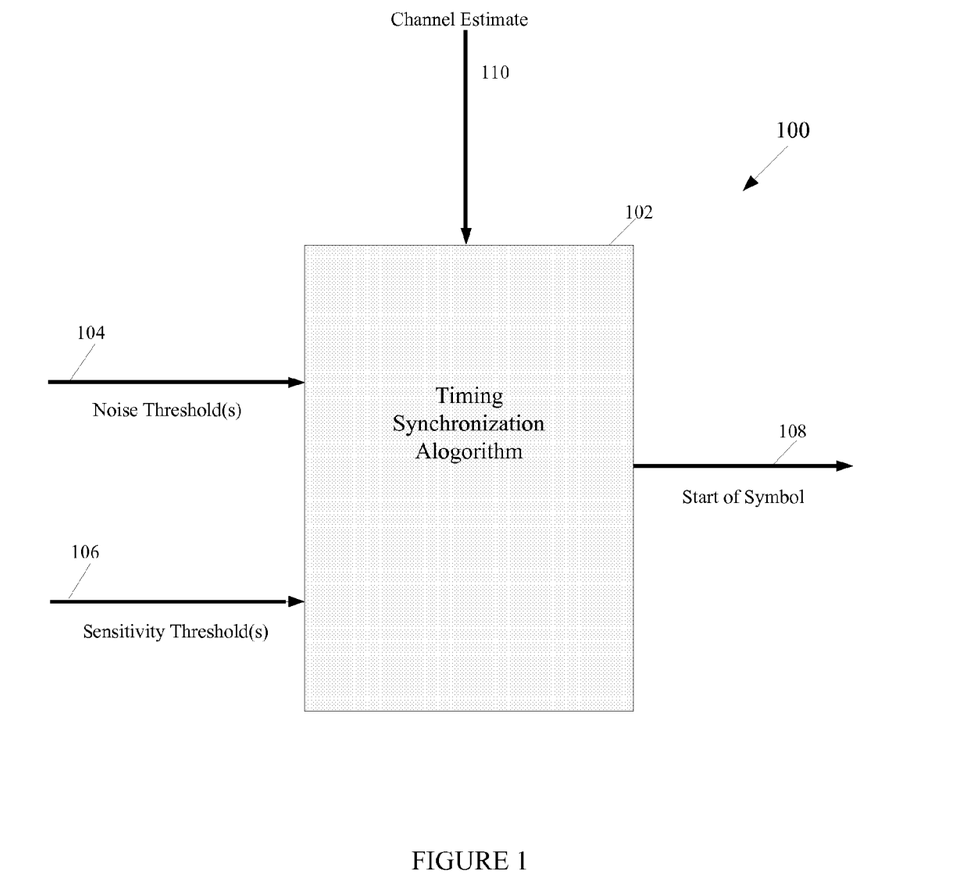
FIG. 1 is an exemplary high level overview of an adaptive timing synchronization process.

FIG. 1 is an exemplary high level overview of an adaptive timing synchronization process based on measured C/I ratios 100. Dynamic timing synchronization parameter adaptation comprises modifying internal parameters based on the C/I estimate from Wide-Area Identification Channel (WIC) symbols and Wide Area Identifier/Local Area Identifier (WID/LID) energies obtained from Wide-Area Identification Channel/Local-Area Identification Channel (WIC/LIC) symbols respectively in one embodiment. C/I estimates may also be obtained in other ways including using TDM pilot symbols (TDM1, TDM2), channel estimates from TPC symbols or channel estimates from FDM pilots in the data symbols or a combination of these symbols. The adaptive timing synchronization process 100 reduces noise filtering thresholds 104 and increases weak channel tap sensitivities 106 as C/I increases, or channel conditions improve. Conversely, if the total level of interference increases, indicating degraded channel conditions, noise thresholds 104 are increased and sensitivities 106 reduced in order to prevent thermal noise and other sources of interference from influencing timing synchronization decisions.

The timing synchronization algorithm 102 takes as the primary input, a current channel estimate or averaged channel estimate 110 and produces an output comprising a correction to the current Fast Fourier Transform (FFT) sampling window position, delta T (or offset), used for locating the start of data within a current symbol 108. After dynamic parameter adjustment of noise filtering threshold(s) 104 and weak channel tap sensitivity 106 based on the calculated C/I, timing synchronization algorithm 102 locates the beginning of each continuous symbol by finding the boundary between the preamble, or cyclic prefix, and the useful symbol portion, defining the start of a symbol 108.

Figure 2:
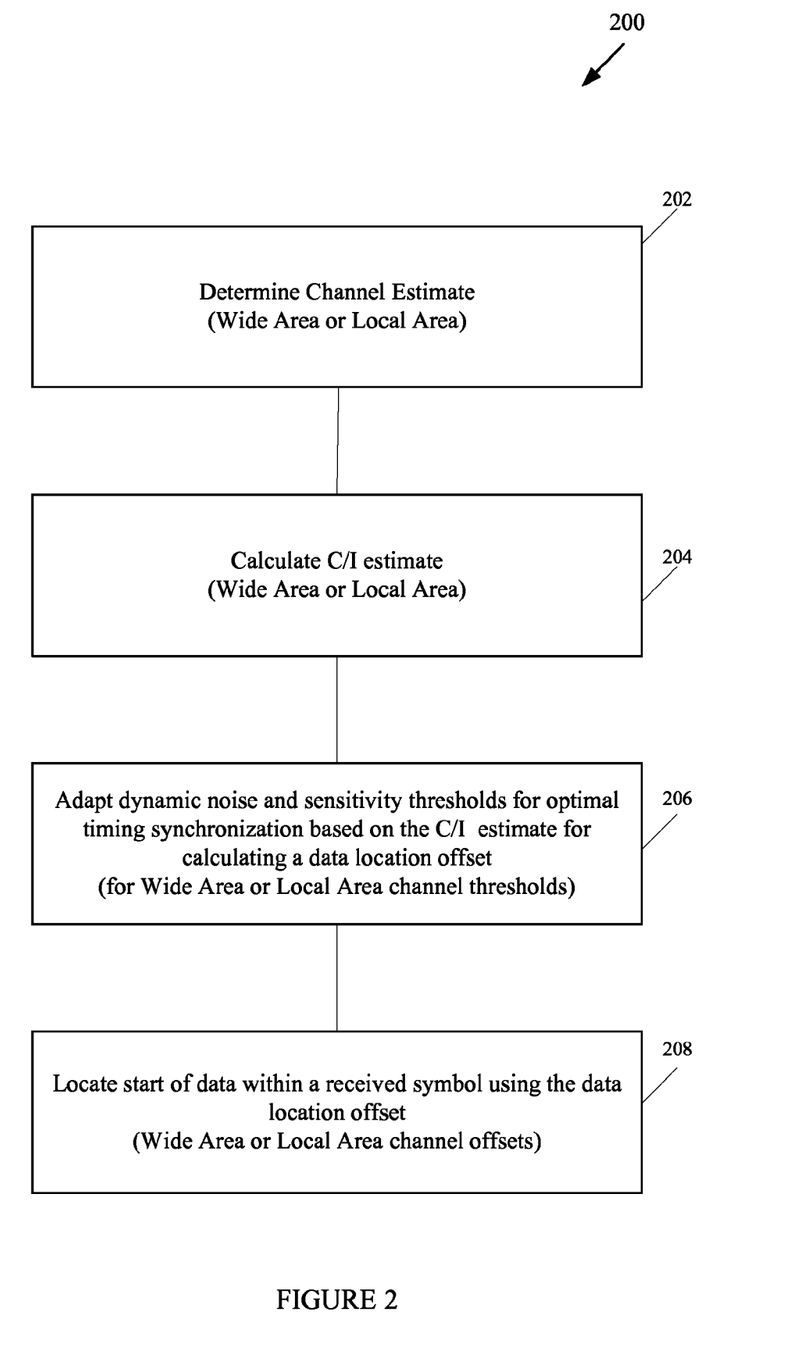
FIG. 2 shows an exemplary method for an adaptive timing synchronization process for dynamically adapting timing synchronization parameters for both wide and local area channels.

FIG. 2 shows an exemplary method for an adaptive timing synchronization process for adapting timing synchronization parameters for both wide and local area channels 200. In one aspect, the adaptive timing synchronization process 200 involves dynamically adjusting timing synchronization parameters stored in receiver hardware or software registers based on instantaneous C/I estimates and/or weighted averaged C/I estimates calculated from WID/LID energies obtained from the WIC/LIC symbols respectively. In various aspects, the instantaneous C/I estimate is calculated using the time domain channel estimate or frequency domain pilot observations from the Frequency Divison Multiplexed (FDM) pilots in the data symbols. In other aspects, time domain channel estimates or frequency domain pilot observations from the Transition Pilot Channel (TPC) symbols are used to calculate instantaneous C/I estimates. C/I may also be estimated from the various other Time Division Multiplexed (TDM) pilot symbols such as TDM1 and TDM2, or Position Pilot Channel (PPC) symbols. Combining C/I estimates from time domain channel estimates or frequency domain pilot observations from the FDM pilots in the data symbols and time domain channel estimates or frequency domain pilot observations from TPC symbols produces a reliable C/I estimate, robust to self interference. Furthermore, a separate weighted C/I estimate for all desired and interfering wide and local area channels can be obtained using these two methods. In yet other aspects, the instantaneous C/I estimates obtained by each of the above methods may be combined to form a single estimate by means of weighted averaging to increase the reliability of the estimate and obtain better interference averaging. For the purpose of this document, a complete description of instantaneous C/I estimates and/or averaged C/I estimates calculated from WID/LID energies is not essential and is therefore not provided. However, a description of these C/I estimation methods can be found in U.S. patent application Ser. No. 12/250,135, entitled "ADAPTIVE THRESHOLDING FOR OFDM CHANNEL ESTIMATION" filed Oct. 13, 2008, and that document is incorporated by reference herein for all purposes.

The adaptive timing synchronization process 200 utilizes two types of input parameters in addition to a current time-domain channel estimate. First, thresholding parameters are used by an internal thresholding process to remove interference from the channel estimate leaving channel taps that contain mostly useful signal energy. Then, sensitivity parameters are used to detect where the majority of the signal energy is located within a current channel estimate and this information is used to align the future FFT sampling window position with the perceived start of a symbol 108.

If the thresholding process were ideal, only taps having signal energy would remain after thresholding and no non-zero taps would contain only interference energy.

It would then be simple to identify the start of symbol location because any tap with energy above zero would be signal energy and the first non-zero tap would represent the start of the symbol within a received signal.

However, finding the location of the signal energy in a received signal is complicated by two problems because the thresholding process is not ideal. First, some of the taps remaining after thresholding might contain interference energy. Secondly and more problematic, depending on the selection of a collection window for the channel estimate, (i.e. the location of M samples selected for the FFT window used in channel estimation), the channel estimate is cyclically shifted in time domain. Time shifts can cause the first path of the communication channel to appear near the end of the time-domain channel estimate, while the later paths can appear to wrap around to the beginning of the channel estimate. In other words, some of signal taps appear to spill over before the zero location causing the actual start of symbol to be a negative location. Here, finding the location of the first non-zero signal tap is non-trivial.

A description of the internal sliding collection window algorithm used in these circumstances is described in detail in U.S. patent application Ser. No. 11/371,536, entitled "TIME TRACKING FOR A COMMUNICATION SYSTEM" filed Mar. 8, 2006, and that document is incorporated by reference herein for all purposes. The sliding collection window algorithm accumulates the received signal energy and compares it to an adaptable sensitivity threshold. A typical channel estimate may begin and end with relatively weak sample energies while the bulk of the signal energy is centrally located. The sensitivity parameter determines the permitted weakness of the beginning and end samples compared to the bulk of the signal energy. If sensitivity is infinite, very weak samples are detected as signal. The sensitivity is therefore set as the ratio of the energy in the weak signal path to the bulk of the signal energy measured as the maximum of the accumuated channel energy computed over some number of consecutive taps. Thus, the sensitivity is set relative to the highest value of the accumulated energy. After weak signal taps have been further eliminated by comparison to the sensitivity thresholds, the start of data within the current symbol is determined.

In step 202, occurring in response to periodic hardware interrupts, a current channel estimate having a plurality of signal taps is determined. Control flow proceeds to step 204.

In step 204, a C/I estimate calculated. For example, one of the methods described in 070879. can be used to determine C/I. The C/I estimate may be a current instantaneous value and/or a weighted average C/I estimate calculated from a dedicated instantaneous WIC symbol, WIC symbol averages over time, pilot symbols, pilot symbols averaged over time, or a combination of these methods. Control flow proceeds to step 206.

In step 206, noise and sensitivity parameters are dynamically adapted for optimal timing synchronization in accord with the channel conditions indicated by the C/I estimate calculated in step 204. Noise filtering thresholds are lowered and weak channel tap sensitivities are increased when the C/I estimate indicates improving channel conditions. Noise thresholds are increased and weak channel tap sensitivities are decreased when the C/I estimate indicates deteriorating channel conditions.

In one aspect, for simplicity of implementation, noise and sensitivity parameters are selected from a look up table based on the current C/I estimate. A row of sensitivity and threshold parameters is assigned to particular range of C/I estimate values. For example, a first row of parameters is selected if the C/I estimate is less than 1.. A second row of parameters is selected if C/I is between 1. and 2, and so on.

Parameter values for each row are heuristically determined. In one aspect, the entire range of measurable C/I values is divided into four segments, and associated with these segments are four values of timing synchronization parameters comprising two noise threshold parameters, $T_{TDM2}$ and $T_{DMTT}$, as well as two sensitivity parameters, $\alpha_{TDM2}$ and weak path estimation detection threshold, $\epsilon_{DMTT}$. The noise threshold parameter $T_{TDM2}$ is used as a energy threshold to remove noise from channel estimates obtained from TDM pilot 2. The energy in each of the taps in TDM2 channel estimate is compared with the energy threshold $T_{TDM2}$. The channel estimate tap is replaced by zero if the tap energy is below $T_{TDM2}$. Similarly, $T_{DMTT}$ is used as a energy threshold to remove noise from channel estimates obtained using the Frequency Division Multiplexed (FDM) pilots present in the data symbols. After the thresholding operation on the channel estimate, where most of the noise taps are removed used the adaptive threshold based on the computed C/I, the next step in timing synchronization or timing tracking is to determine the first arrival path and/or the last arrival path to determine the window for collecting the useful samples in the OFDM symbol. In a particular embodiment, $\alpha_{TDM2}$ is used to determine the first arrival path in TDM2 symbol while $\epsilon_{DMTT}$ is used to determine the first arrival path as well as the last arrival path in time tracking using the channel estimate from the TPC symbols or the FDM pilots in the data symbols. In one implementation aspect, $\epsilon_{DMTT}$ is portioned into forward and backward detection thresholds. The forward detection threshold applies to early path detection, while the backward portion applies to late path detection. The epsilon parameter may be further configured to different values depending on whether the current channel is considered long or not. In a particular embodiment, $T_{TDM2}$ and $T_{DMTT}$ are chosen as a multiple of the interference estimate obtained during the computation of C/I. The multiple can be chosen between 25. and 35. times the interference estimate depending on the C/I estimated for robust performance across various channel multipath and power profiles. A description of formulas that determine the computation of late and early arrival paths from alpha and epsilon parameters, and slow filter averaging is described in detail in U.S. patent application Ser. No. 11/371,536, entitled "TIME TRACKING FOR A COMMUNICATION SYSTEM" filed Mar. 8, 2006, and that document has been previously incorporated by reference herein for all purposes.

Table row parameter values are calculated based on the assumed variance of noise and interference energy present in the channel estimate. For example, the energy in a single noise tap in the channel estimate obtained at 0. dB C/I is given by (after appropriate scaling to account for fixed point implementation):

$$\sigma_{0dB}^2 = 0.0199.$$

Similarly, the noise tap energies at 4. dB, 7.5. dB and 12. dB are given by 0.0079, 0.0035, and 0.00125, respectively. The noise tap energy thus computed can then be used to determine noise threshold values ($T_{TDM2}$, $T_{DMTT}$), and sensitivity parameters ($\alpha_{TDM2}$ and $\epsilon_{DMTT}$). The parameters may also be pre-computed and stored in a look up table for easy implementation in a device. An example of a look up table is as follows.

| $C/I_{avg}>$ | But $C/I_{avg}<=$ | $T_{TDM2}$ | $T_{DMTT}$ | $\alpha_{TDM2}$ | $\epsilon_{DMTT}$ |
|---|---|---|---|---|---|
| 0 | 1.25 | 14 | 10 | 4/128 | 4/128 |
| 1.25 | 4 | 9 | 9 | 3/128 | 3/128 |
| 4 | 10 | 5 | 6 | 2/128 | 2/128 |
| 10 | ∞ | 4 | 4 | 2/128 | 2/128 |

When possible (except for saturation), the $\alpha_{TDM2}$ parameter is calculated such that the timing synchronization acquisition reacts to weak early paths three to four times stronger than the set noise threshold. It is sometimes desirable to saturate the sensitivity to weak early paths a fixed number—approximately 17. dB below the main dominant path for example, when the C/I exceeds a certain number (10. dB for example) indicating that the influence of the noise taps on the detection of the first path in the timing algorithm is negligible compared to the weak paths that may be present in the channel profile.

The values $T_{DMTT}$, and $\epsilon_{DMTT}$ for data mode time tracking are then chosen to roughly correspond to (but be slightly more sensitive than) the values picked for noise threshold processing. For example, for C/I values between 0. dB and 1.25. dB, the sensitivity to weak early paths is at approximately 14. dB, which in linear scale corresponds to almost 5/128, and the corresponding values $\epsilon_{DMTT}$ are chosen as 4/128.

After the noise thresholds, and sensitivity thresholds are dynamically adapted for optimization in steps 202-206 based on current channel conditions measured by C/I, control flow proceeds to step 208 where the timing synchronization a Algorithm uses the optimized parameters to modify the position of the current FFT sampling window 504. Symbol structure and different choices for window position are detailed in FIGS. 3-5.

Figure 3:
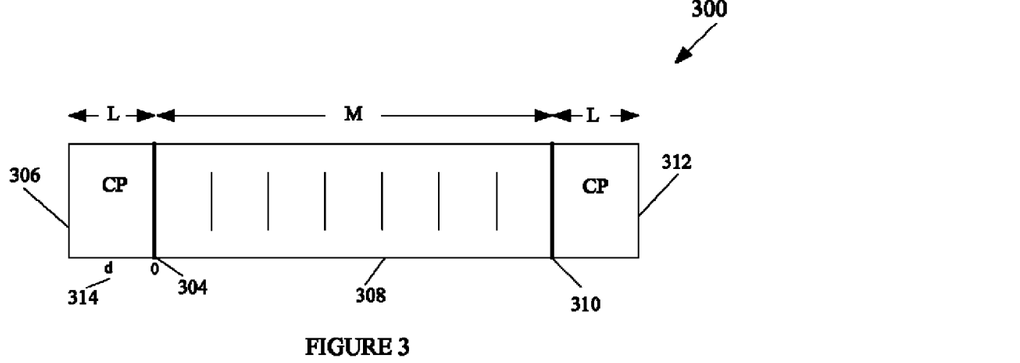
FIG. 3 illustrates an exemplary OFDM symbol.

In step 208, the first sample after the cyclic prefix pertaining to the current symbol, detailed by element 304 in FIG. 3, is located by analyzing the channel estimate.

Figure 4:
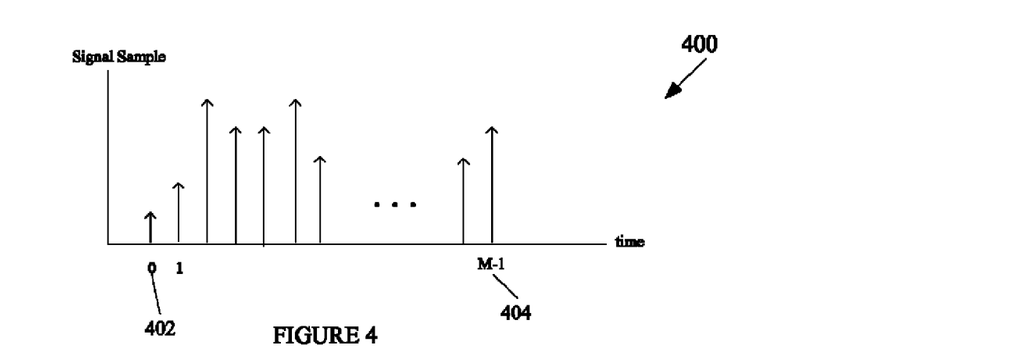
FIG. 4 illustrates an exemplary received signal sample sequence collected in the time domain.
Figure 5:
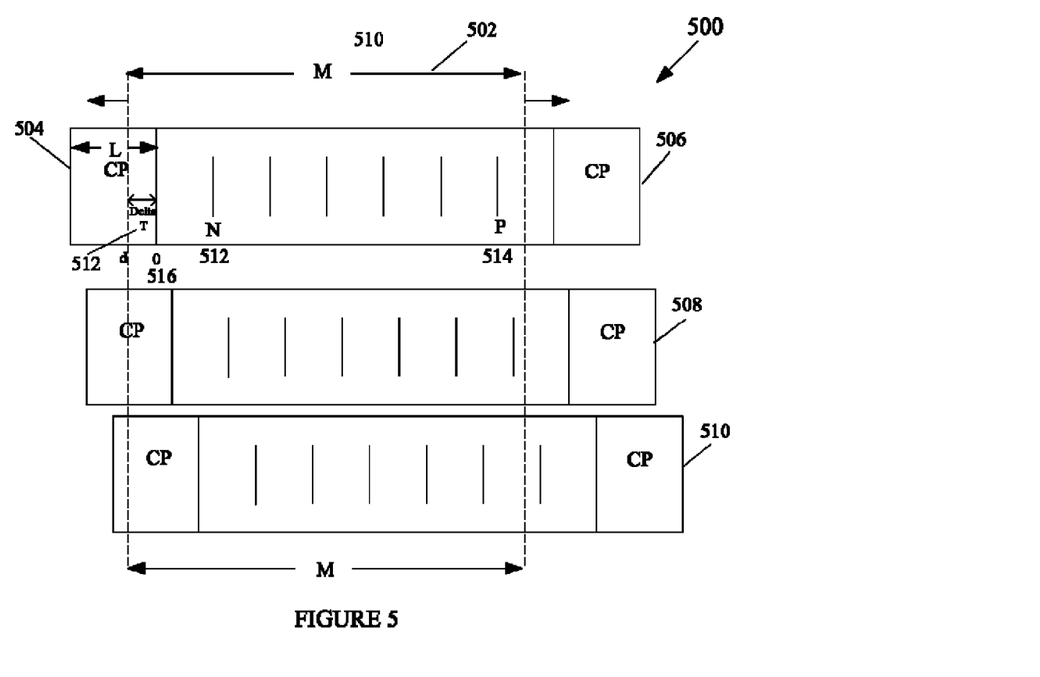
FIG. 5 illustrates an exemplary correction to a current FFT sampling window position delta T (or offset) for locating the start of data within a current symbol.

M samples of a received signal sequence are collected in the time domain and treated as one symbol as detailed by samples between 402 and 404 in FIG. 4. This is otherwise known as the FFT sampling window. The problem of determining where to start collecting the first sample 402 is complicated by multipath, where multiple copies of the received signal arrive from reflections or multiple sources as illustrated in FIG. 5.

Multipath creates more than one tap in the channel estimate that contains the channel energy, translating to a number of copies of the same signal delayed by some factor and multiplied by a scalar 506-510. Delayed copies of the symbol 508,510 cause the cyclic prefixes and boundaries to be overlayed, which causes distortion because information from delayed symbols leaks into the first symbol. Hence, a sampling window of length M 502, representing the input time-domain samples which are collected, processed by the Fast Fourier Transform (FFT) and used for data demodulation, channel estimation, timing synchronization, etc., must be taken from an overlap of the copies 506-510 that all correspond to the same symbol. This is where the cyclic prefix of length L becomes useful.

The cyclic prefix 306,504 is an over send of length L of the data and pilots sent in the transmission signal. Thus, the cyclic prefix 306,504 provides a guard of L samples such that when symbols are overlapped, a portion of the required M symbol samples may be taken from the cyclic prefix as well as the data and pilot portion of the symbol 308. In other words, a window of length M 502 may be shifted backwards or forwards to compensate for forward shifting of the delayed symbols.

A channel estimate in the time domain is produced by performing an FFT on M samples, demodulating the pilot subcarrriers and then performing an Inverse Fast Fourier Transform (IFFT) on the demodulated pilot subcarriers. For example, if exactly M samples are collected from the start of data boundary 304 to the end of data boundary 310, the channel estimate will have one tap aligned with position 0. Thus, the correspondence between the time domain channel estimate and the position of the FFT sampling window 502 is established wherein the first tap is aligned with position 0 in the channel estimate. Hence, if the FFT sampling window is moved backwards in time earlier into the cyclic prefix by d samples, the corresponding tap in the time domain channel estimate will occur at position d, i.e delayed by d from position 0. Similarly, if the first tap in the channel estimate appears located at position d, this indicated that the current FFT sampling window is located d samples prior to the end of cyclic prefix of the first received signal copy, 506. This illustrates the dependence between the channel estimate and the position of the FFT sampling window, 502. In this manner, a sample missing from the end of the data segment 308 may be recovered from the cyclic prefix at the beginning 306 which is reflected in modified channel estimate in time domain, The sliding window 502 may alternately be perceived as a circular buffer where M data samples are taken from a circular buffer of length M+2. L. Taking a first sample at position d 314,404,512 is tantamount to delaying the signal by time period d. The nature of the resulting time domain channel estimate depends on the position of the FFT collection window because selecting a different set of samples alters the resulting channel estimate. When M samples are collected d samples into the cyclic prefix 314,404,512, no information is lost because the delayed information is recovered from the prefix 306,504. All the channel taps that appear between 0 and L contribute to useful signal energy without adding any inter symbol interference and inter carrier interference. As long as all of the signal information is within the first L samples, the signal can be decoded without any degradation. Alternately, even if some signal taps are lost outside of the region defined by L, there is a graceful and gradual degradation. When a channel estimate having most of the signal energy concentrated in the first L sample is input to the timing synchronization algorithm, no collection window 502 adjustment is necessary. Otherwise, the timing synchronization algorithm commands back to its internal window collecting algorithm to move the window 502 within the beginning L samples.

In order to ensure that channel information is contained in the L samples, the internal window collection algorithm examines the signal information to detect which locations within the channel estimate contain the majority of the signal energy and which locations contain interference energy. By examining the location of signal energy and interference energy within the channel estimate, the first/earliest 506, intermediate 508 and latest 510 signal paths are identified. Based on the channel estimate and the desired location of the first and the last paths in the channel estimate, the M samples defining the FFT sampling window are obtained for the current OFDM symbol and future OFDM symbols until the channel estimate for next timing correction is available or until the next timing correction decision is made.

Thus, the adaptive timing synchronization process can be summarized as a two step process where first, interference energy is removed from a time domain channel estimate by a mathematical comparison with one or more adaptive noise thresholds and second, the received signal paths in the time domain channel estimate are compared to one or more adaptive sensitivity thresholds so that the locations where the signal energy begins and ends can be determined because the average noise power per sample in the channel estimate for a set C/I can be mathematically predicted as described above. After these locations are determined, the beginning energy location can be aligned to a desired location with respect to the start of a symbol by a simple time shift of delta T (d).

FIG. 3 illustrates an exemplary OFDM symbol 300. The data and pilot information 308 is preceded by a cyclic prefix of length L containing duplicate pilot and data information. The data and pilot information 308 is also followed by a cyclic prefix of length L containing duplicate pilot and data information 312. A starting boundary 304 separates the data and pilot information 308 from the preceding cyclic prefix 306. Starting boundary 304 for the FFT sample collection window of length M corresponds to position zero of the time domain channel estimate. FFT sample collection window of sample length M. An ending boundary 310 separates the data and pilot information 308 from the following cyclic prefix 312. A start of symbol location may be shifted to position d 314 to maintain the bulk of the received signal energy within the current FFT sampling window to be partaining to the same OFDM symbol.

FIG. 4 illustrates an exemplary received signal sample sequence collected in the time domain 400

FIG. 5 illustrates an exemplary correction to the current FFT sampling window position delta T (or offset) for locating the start of data within a current symbol 500. First/earliest signal path 506, intermediate signal path 508 and latest signal path 510 are shown wherein intermediate signal path 508 and latest signal path 510 are delayed by a scalar. FFT sampling window of length M 502 may be shifted in time by Delta T 512 to align the bulk of the signal energy in the resulting time domain channel estimate as closely as possible with position 0 516 or within the first L samples that corresponds to the cyclic prefix 504.

Figure 6:
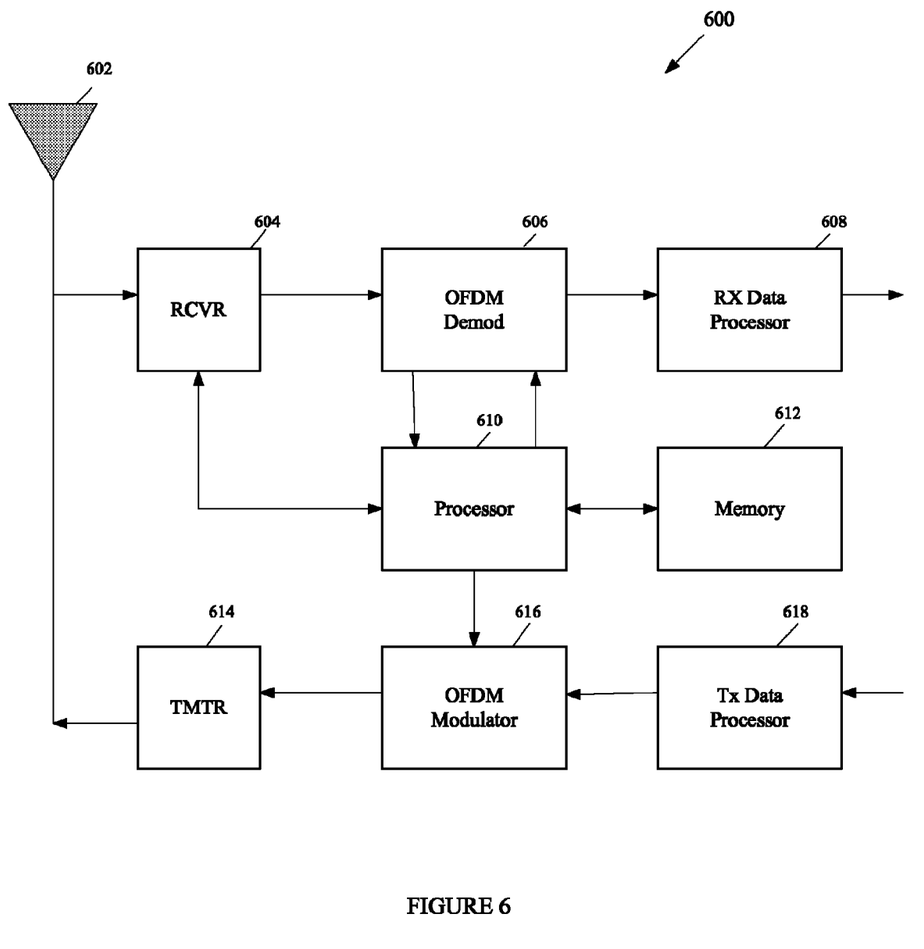
FIG. 6 is an exemplary simplified functional block diagram of an OFDM receiver having adaptive timing synchronization processing capability.

FIG. 6 is an exemplary simplified functional block diagram of an OFDM receiver having adaptive timing synchronization processing capability. Antenna 602 receives a transmitted signal and provides a received signal to a receiver unit (RCVR) 604. Receiver unit 604 conditions (e.g., filters, amplifies, and frequency downconverts) the received signal and digitizes the conditioned signal to obtain samples. An OFDM demodulator 606 strips the cyclic prefix appended to each OFDM symbol, transforms each received stripped symbol to the frequency domain using an N-point FFT, obtains N received symbols for the N subbands for each OFDM symbol period, and provides received WIC, TPC, PPC and other symbols to a processor 610 for channel estimation.

OFDM demodulator 606 further receives a frequency response estimate for the received signal from processor 610, performs data demodulation on the received data symbols to obtain data symbol estimates (which are estimates of the transmitted data symbols), and provides the data symbol estimates to an RX data processor 608. RX data processor 608 demodulates (i.e., symbol demaps), deinterleaves, and decodes the data symbol estimates to recover the transmitted traffic data.

Processor 610 obtains the received WIC or other channel estimation symbols for the active channel and performs channel estimation. The adaptive timing synchronization process 300 based on channel conditions described herein may be implemented by suitable instructions operating on the processor 610 and memory 612 of Receiver 600, but is certainly not limited to such an implementation. The processor 610 is connected to memory 612 having code or instructions directing the processor 610 to provide adaptive timing synchronization. Memory 612 may comprise instructions for determining a channel estimate, calculating a C/I estimate from the channel estimate, adapting timing synchronization noise and sensitivity thresholds based on the C/I estimate and locating the start of data within a received symbol. The memory 612 may comprise RAM memory, flash memory, ROM memory, EPROM memory, EEPROM memory, registers, a hard disk, a removable disk, a CD-ROM, or any other form of storage medium or computer readable media known in the art.

In an exemplary aspect, the processor 610 executes instructions stored in memory 612 according to the steps of FIGS. 1-2 to provide dynamic adaptive timing synchronization based on measured channel conditions. The methodologies described in FIGS. 1-2 may be implemented by various means depending upon the application. For example, these methodologies may be implemented in hardware, firmware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

Firmware and/or software implementations of the methodologies described in FIGS. 1-2 may be implemented with modules (e.g., procedures, functions, and so on) that perform the functions described herein. For example, software codes may be stored in a memory, for example the memory 612 of the Receiver 600, and executed by a processor, for example the processor 610 of the Receiver 600. Memory may be implemented within the processor 610 or external to the processor 610. As used herein the term "memory" refers to any type of long term, short term, volatile, nonvolatile, or other memory and is not to be limited to any particular type of memory or number of memories, or type of media upon which memory is stored.

Any machine or computer readable medium tangibly embodying instructions may be used in implementing the methodologies described herein. In an exemplary aspect, the processor 610 executes instructions stored in a computer readable medium according to the steps of FIGS. 1-2 to provide an adaptive timing synchronization process.

TX data processor 618 processes traffic data and provides data symbols for transmission. An OFDM modulator 616 receives and multiplexes the data symbols with pilot symbols, performs OFDM modulation, and provides a stream of OFDM symbols to transmitter unit 614. The pilot symbols may also be multiplexed with the data symbols using TDM. A transmitter unit 614 then processes the stream of OFDM symbols to generate an uplink signal, which is transmitted via antenna 602 to an access point.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed:

1. A method of locating a symbol boundary in a received communications signal comprising:
    determining a channel estimate;
    calculating a signal energy to interference energy ratio (C/I) estimate;
    adapting timing synchronization noise threshold and sensitivity parameters based on the C/I estimate for calculating a data location offset; and
    locating the start of a symbol within received time-domain samples using the adapted timing synchronization parameters.

2. The method of claim 1 wherein the C/I estimate is obtained from WIC symbols, LIC symbols, data symbols, TDM pilots, TPC symbols or any combination of the symbols.

3. The method of claim 1 wherein separate C/I estimates are independently obtained for wide area and local area channels.

4. The method of claim 1 wherein the C/I estimate is an instantaneous C/I estimate.

5. The method of claim 1 wherein the C/I estimate is a weighted average C/I estimate.

6. The method of claim 1 wherein the C/I estimate is a function of an instantaneous C/I estimate and a weighted average C/I estimate.

7. The method of claim 1 wherein sensitivity parameters are adapted for early and late signal paths.

8. The method of claim 1 wherein the adapting timing synchronization noise threshold and sensitivity parameters based on the C/I estimate comprises selecting the parameters from a look up table according to the C/I estimate.

9. The method of claim 8 wherein the look up table row parameter values are calculated based on the assumed variance of noise and interference energy present in the channel estimate.

10. The method of claim 1 wherein threshold parameters are adapted for changing channel conditions.

11. The method of claim 1 wherein the adapting timing synchronization noise threshold and sensitivity parameters based on the C/I estimate comprises selecting the parameters based on a computation performed by a receiver.

12. The method of claim 1 wherein different timing synchronization parameters are used for wide area channels and local area channels.

13. An Orthogonal Frequency Division Multiplex (OFDM) receiver, the receiver comprising:
   an antenna for receiving a transmitted signal and providing the received signal to a receiver unit;
   a receiver unit for conditioning the received signal by filtering, amplifying, and frequency down converting the received signal, and digitizing the conditioned signal to provide samples and symbols to an OFDM demodulator;
   an OFDM demodulator for transforming received symbols to the frequency domain and providing the symbols to a processor for channel estimation;
   a processor for processing the received symbols to determine a channel estimate, calculate a signal energy to interference energy ratio (C/I) estimate from the channel estimate, adapt timing synchronization noise threshold and sensitivity parameters based on the C/I estimate for calculating a data location offset, and locate the start of data within a received communications system using the adapted timing synchronization parameters.

14. The receiver of claim 13 wherein sensitivity parameters are adapted for early and late signal paths.

15. The receiver of claim 13 wherein the adapting timing synchronization noise threshold and sensitivity parameters based on the C/I estimate comprises selecting the parameters from a look up table according to the C/I estimate.

16. The receiver of claim 15 wherein the look up table row parameter values are calculated based on the assumed variance of noise and interference energy present in the channel estimate.

17. The receiver of claim 13 wherein the C/I estimate is obtained from WIC symbols, LIC symbols, data symbols, TDM pilots, TPC symbols or any combination of the symbols.

18. The receiver of claim 13 wherein separate C/I estimates are independently obtained for wide area and local area channels.

19. The receiver of claim 13 wherein the C/I estimate is an instantaneous C/I estimate.

20. The receiver of claim 13 wherein the C/I estimate is a weighted average C/I estimate.

21. The receiver of claim 13 wherein the C/I estimate is a function of an instantaneous C/I estimate and a weighted average C/I estimate.

22. The receiver of claim 13 wherein threshold parameters are adapted for changing channel conditions.

23. The receiver of claim 13 wherein the adapt timing synchronization noise threshold and sensitivity parameters based on the C/I estimate comprises selecting the parameters based on a computation performed by a receiver.

24. The receiver of claim 13 wherein different timing synchronization parameters are used for wide area channels and local area channels.

25. An apparatus for locating data in a received communications symbol comprising:
   means for determining a channel estimate;
   means for calculating a signal energy to interference energy ratio (C/I) estimate from the channel estimate;
   means for adapting timing synchronization noise threshold and sensitivity parameters based on the C/I estimate for calculating a data location offset; and
   means for locating the start of data within a received communications system using adapted timing synchronization parameters.

26. The apparatus of claim 25 wherein sensitivity parameters are adapted for early and late signal paths.

27. The apparatus of claim 25 wherein the adapting timing synchronization noise threshold and sensitivity parameters based on the C/I estimate comprises selecting the parameters from a look up table according to the C/I estimate.

28. The apparatus of claim 25 wherein the look up table row parameter values are calculated based on the assumed variance of noise and interference energy present in the channel estimate.

29. The apparatus of claim 25 wherein the C/I estimate is obtained from WIC symbols, LIC symbols, data symbols, TDM pilots, TPC symbols or any combination of the symbols.

30. The apparatus of claim 25 wherein separate C/I estimates are independently obtained for wide area and local area channels.

31. The apparatus of claim 25 wherein the C/I estimate is an instantaneous C/I estimate.

32. The apparatus of claim 25 wherein the C/I estimate is a weighted average C/I estimate.

33. The apparatus of claim 25 wherein the C/I estimate is a function of an instantaneous C/I estimate and a weighted average C/I estimate.

34. The apparatus of claim 25 wherein threshold parameters are adapted for changing channel conditions.

35. The apparatus of claim 25 wherein the adapting timing synchronization noise threshold and sensitivity parameters based on the C/I estimate comprises selecting the parameters based on a computation performed by a receiver.

36. The apparatus of claim 25 wherein different timing synchronization parameters are used for wide area channels and local area channels.

37. A computer readable medium encoded with a computer program configured to direct a processor to perform the steps comprising:
   determining a channel estimate;
   calculating a signal energy to interference energy ratio (C/I) estimate from the channel estimate;

adapting timing synchronization noise threshold and sensitivity parameters based on the C/I estimate for calculating a data location offset; and locating the start of data within a received communications system using adapted timing synchronization parameters.

38. The computer readable medium of claim 37 wherein sensitivity parameters are adapted for early and late signal paths.

39. The computer readable medium of claim 38 wherein the adapting timing synchronization noise threshold and sensitivity parameters based on the C/I estimate comprises selecting the parameters from a look up table according to the C/I estimate.

40. The computer readable medium of claim 39 wherein the look up table row parameter values are calculated based on the assumed variance of noise and interference energy present in the channel estimate.

41. The computer readable medium of claim 37 wherein the C/I estimate is obtained from WIC symbols, LIC symbols, data symbols, TDM pilots, TPC symbols or any combination of the symbols.

42. The computer readable medium of claim 37 wherein separate C/I estimates are independently obtained for wide area and local area channels.

43. The computer readable medium of claim 37 wherein the C/I estimate is an instantaneous C/I estimate.

44. The computer readable medium of claim 37 wherein the C/I estimate is a weighted average C/I estimate.

45. The computer readable medium of claim 37 wherein the C/I estimate is a function of an instantaneous C/I estimate and a weighted average C/I estimate.

46. The computer readable medium of claim 37 wherein threshold parameters are adapted for changing channel conditions.

47. The computer readable medium of claim 37 wherein the adapting timing synchronization noise threshold and sensitivity parameters based on the C/I estimate comprises selecting the parameters based on a computation performed by a receiver.

48. The computer readable medium of claim 37 wherein different timing synchronization parameters are used for wide area channels and local area channels.

* * * * *